(12) United States Patent
Nguyen et al.

(10) Patent No.: US 11,879,094 B2
(45) Date of Patent: Jan. 23, 2024

(54) ENHANCING FRICTION REDUCTION AND PROTECTION OF WELLBORE EQUIPMENT DURING HYDRAULIC FRACTURING

(71) Applicant: Halliburton Energy Services, Inc., Houston, TX (US)

(72) Inventors: Philip D. Nguyen, Houston, TX (US); Josselyne Chano, Houston, TX (US); Ronald Glen Dusterhoft, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 23 days.

(21) Appl. No.: 17/832,260

(22) Filed: Jun. 3, 2022

(65) Prior Publication Data
US 2023/0392067 A1   Dec. 7, 2023

(51) Int. Cl.
*C09K 8/54* (2006.01)
*C09K 8/66* (2006.01)
*E21B 43/267* (2006.01)
*C09K 8/68* (2006.01)

(52) U.S. Cl.
CPC ............. *C09K 8/54* (2013.01); *C09K 8/665* (2013.01); *C09K 8/68* (2013.01); *E21B 43/267* (2013.01); *C09K 2208/28* (2013.01)

(58) Field of Classification Search
None
See application file for complete search history.

(56) References Cited

U.S. PATENT DOCUMENTS

| | | |
|---|---|---|
| 3,580,943 A | 5/1971 | Trepanier |
| 3,960,576 A | 6/1976 | Carter et al. |
| 3,973,056 A | 8/1976 | Fessler et al. |
| 4,500,445 A | 2/1985 | French et al. |
| 4,828,796 A | 5/1989 | Shishkin et al. |
| 5,137,657 A | 8/1992 | Boffardi |
| 6,017,994 A | 1/2000 | Carter et al. |
| 9,067,821 B2 | 6/2015 | Bleecher et al. |
| 10,246,784 B2 | 4/2019 | Liu et al. |
| 10,316,712 B2 | 6/2019 | Douglass et al. |
| 10,329,477 B2 | 6/2019 | Al-Mutairi et al. |
| 2010/0233471 A1 | 9/2010 | Hayes et al. |

(Continued)

FOREIGN PATENT DOCUMENTS

| | | |
|---|---|---|
| WO | 2007149113 A2 | 12/2007 |
| WO | 2010005889 A1 | 1/2010 |
| WO | 2021208686 A1 | 10/2021 |

OTHER PUBLICATIONS

Mainier, et al. "The Use of Sodium Silicate as a Corrosion Inhibitor in a Saline Drilling Fluid: A Nonaggressive Option to the Environment", Journal of Environmental Protection, 2016, vol. 7, pp. 2025-2035.

*Primary Examiner* — Andrew Sue-Ako
(74) *Attorney, Agent, or Firm* — Barnes & Thornburg LLP (57) ABSTRACT

Methods and fluids for enhancing friction reduction. An example method introduces a treatment fluid into a wellbore tubing disposed in a wellbore. The wellbore tubing is composed of metal ions. The treatment fluid is composed of an aqueous fluid and a metal silicate. The method further includes coating at least a portion of the wellbore tubing with a silicate film produced from the reaction of the metal silicate with the metal ions of the wellbore tubing and then fracturing the subterranean formation.

14 Claims, 9 Drawing Sheets

(56) References Cited

U.S. PATENT DOCUMENTS

| | | | |
|---|---|---|---|
| 2013/0029165 A1* | 1/2013 | Johnson | C09D 5/08 |
| | | | 428/469 |
| 2013/0075083 A1* | 3/2013 | Gard | E21B 17/042 |
| | | | 166/242.6 |
| 2016/0002521 A1* | 1/2016 | Dillon | C09K 8/08 |
| | | | 507/201 |
| 2016/0024891 A1* | 1/2016 | Fursdon-Welsh | C09K 8/602 |
| | | | 166/300 |
| 2016/0090525 A1* | 3/2016 | McDonald | C01B 33/143 |
| | | | 507/269 |
| 2016/0258264 A1* | 9/2016 | Lesko | E21B 43/26 |
| 2021/0269704 A1 | 9/2021 | Khamatnurova et al. | |

* cited by examiner

ENHANCING FRICTION REDUCTION AND PROTECTION OF WELLBORE EQUIPMENT DURING HYDRAULIC FRACTURING

TECHNICAL FIELD

The present disclosure relates generally to hydraulic fracturing operations, and more particularly, to enhancing friction reduction and protecting wellbore equipment with the use of metal silicates during hydraulic fracturing.

BACKGROUND

Hydraulic fracturing operations may require high injection rates to achieve sufficient downhole pressure to generate a fracture in a subterranean formation. Friction reducers may be used to overcome the impact of high friction pressures produced from the high injection rates. Friction reducers may be less effective in aqueous fluids with a high total dissolved solids content such as a brine. These aqueous fluids may incompletely hydrate the friction reducers thereby producing a coiled conformation of the molecular structure. To compensate for this issue, the concentration of friction reducers may be increased. Friction reducers may be expensive and increasing their concentration can increase overall operation costs. Additionally, aqueous fluids with high total dissolved solids content may increase chemical and/or electrochemical reactions at metal surfaces. As a result, pitting and corrosion may occur in wellbore equipment.

The present invention provides improved methods and compositions for enhancing friction reduction and protecting wellbore equipment during hydraulic fracturing.

BRIEF DESCRIPTION OF THE DRAWINGS

Illustrative examples of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different examples may be implemented.

DETAILED DESCRIPTION

The present disclosure relates generally to hydraulic fracturing operations, and more particularly, to enhancing friction reduction and protecting wellbore equipment with the use of metal silicates during hydraulic fracturing.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The present disclosure relates generally to hydraulic fracturing operations, and more particularly, to enhancing friction reduction and protecting wellbore equipment with the use of metal silicates during hydraulic fracturing. The metal silicates are introduced downhole as a component of a treatment fluid. In some examples, the treatment fluid may be a pad fluid, a fracturing fluid, or a spacer fluid introduced between proppant stages. In other examples, the treatment fluid may not be part of the fracturing operation and may be a pre- or post-fracturing fluid. In some examples, the treatment fluid may be used to partially fill the wellbore prior to or after a fracturing operation.

Advantageously, the metal silicates may be used to produce a silicate coating on surface or downhole wellbore equipment that comes into contact with the metal silicates. The silicate coating may enhance the friction reduction of subsequent fracturing fluids. This enhancement may allow for the use of lesser concentrations of friction reducers or may improve the friction reduction of subsequent fracturing fluids with high total dissolved solids content. The metal silicate coating may also shield the coated wellbore equipment from chemical and/or electrochemical reactions that may cause pitting or corrosion of the wellbore equipment. As a further advantage the metal silicate solution may alter the wettability of formation surfaces it contacts from oil-wet to water-wet. A further advantage is that the treatment fluids and methods may remove oil from the rock surface allowing the rock surface to be made water-wet and for the oil coating to be displaced. A consequence of removing the oil from the water surface is that fluid flow and permeability may be improved as fractures are reconnected and proppant packs are unblocked. This change in wettability may improve flowback during the flowback stage as well as oil production during well production. The metal silicate coating occurs over stages of fluid exposure. Repeatedly treating the wellbore equipment results in a stable coating of silicate. Additionally, the silicate coating may be replenished after a fracturing operation or the wellbore equipment may be pretreated before a fracturing operation.

Figure 1:
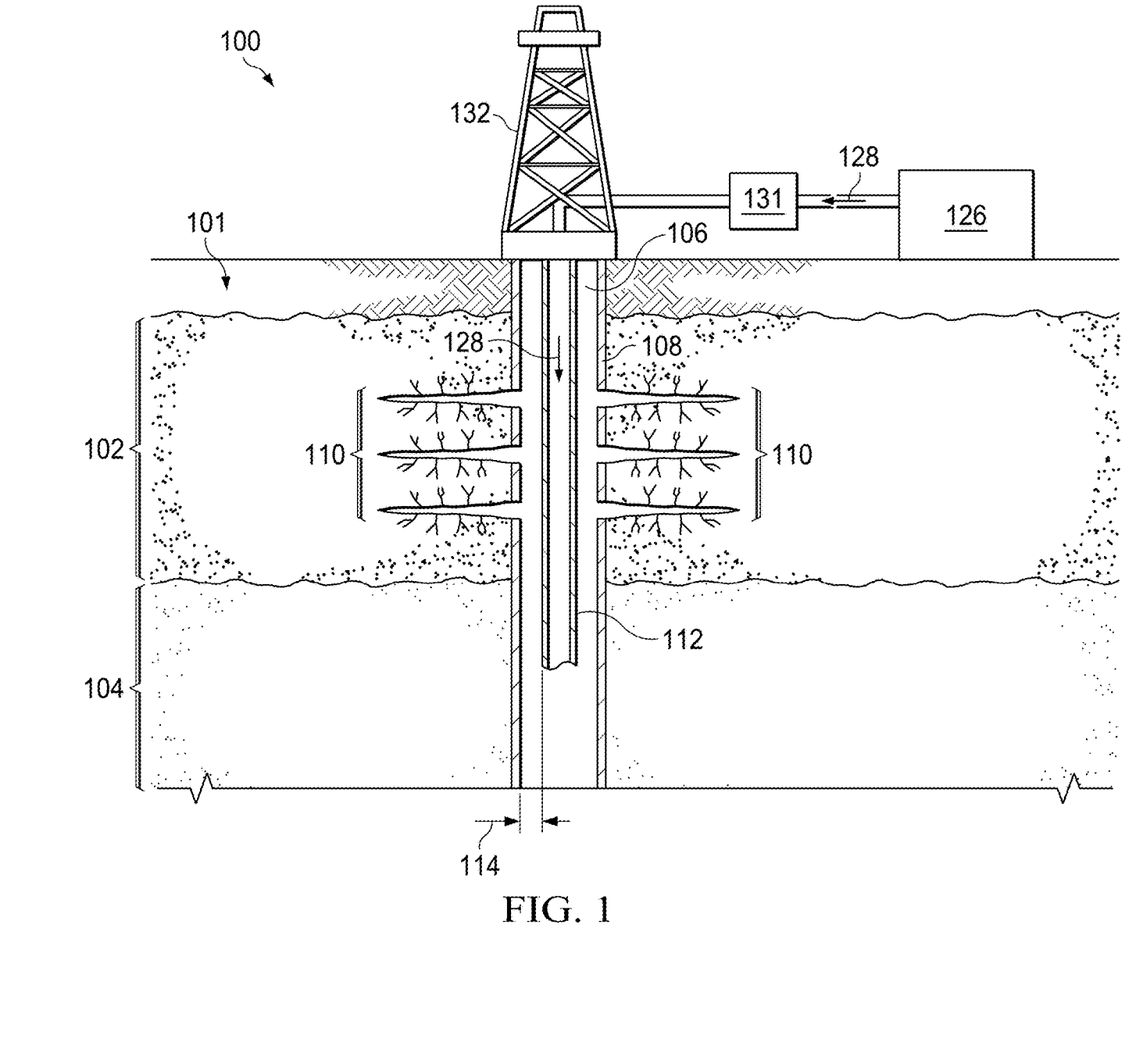
FIG. 1 is a schematic illustrating an example hydraulic fracturing operation in accordance with one or more examples described herein.

FIG. 1 is a schematic view of a well system 100 according to one or more examples. The formation 101 includes reservoir volumes 102, 104 composed of porous and permeable rocks (i.e., reservoir rocks) that contain reservoir fluids (e.g., oil, gas, water, hydrocarbons) located in an onshore environment or in an offshore environment. A well system 100 includes at least one well 106 drilled to penetrate the formation 101 to carry out exploration and extraction of hydrocarbon fluids from the reservoir volumes 102, 104. The well 106 of FIG. 1 is shown as near vertical but can be formed at any suitable angle to reach a hydrocarbon-rich portion of the formation 101. In other examples, the well 106 can follow a partially vertical, angled, or even a partially horizontal path through the formation 101. The well 106 is shown as being lined with an optional protective lining 108 extending through the formation 101. The protective lining 108 may include a casing, liner, or tubing made of any material, including steel, alloys, or polymers, among others. The well 106 may also be partially or fully openhole, i.e., no protective lining. The protective lining 108 is perforated during the fracturing operation to allow a treatment fluid, illustrated as fracturing fluid 128 in this specific example, to fracture the formation and also so that the reservoir fluids flow through fractures 110 formed in the formation 101 and into the well 106.

The fracturing fluid 128 is injected into the well 106 to flow into a tubing string 112 or an annular area 114 located between an inner surface of the well 106 and the tubing string 112. The surface portion of well system 100 delivers the fracturing fluid 128 to a target downhole location. It should be understood that while the surface portion of well system 100 in FIG. 1 generally depicts a land-based system, it is to be recognized that like systems may be operated in subsea locations as well and may include subsea equipment and installations such as risers, tiebacks, flow lines, pumps, mandrels; equally, different maritime units and installations such as floating production offloading vessel are applicable. The surface portion of well system 100 may include a mixing tank 126 in which the fracturing fluid 128 of the present disclosure may be formulated. Within the mixing tank 126, metal silicates may be added to the fracturing fluid 128 for delivery downhole. The fracturing fluid 128 may also comprise friction reducers to reduce friction pressure. The fracturing fluid 128 may be conveyed via a pump 131 to a wellhead 132, where the fracturing fluid 128 enters tubing string 112. Tubing string 112 extends from wellhead 132 into formation 101. Tubing string 112 includes orifices that allow the fracturing fluid 128 to enter the well 106. Pump 131 may be configured to raise the pressure of the fracturing fluid 128 to a desired degree before its introduction into tubing string 112. It is to be recognized that well system 100 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Mixing tank 126 may be upstream of pump 131 and may comprise a vessel in which the components of the fracturing fluid 128 are provided and formulated. For example, the metal silicate, friction reducer, and aqueous base fluid may be mixed within mixing tank 126. Additional components such as proppant and/or clay stabilizers may also be added in some examples. In various examples, pump 131 (e.g., a low-pressure pump, a high-pressure pump, or a combination thereof) may convey the fracturing fluid 128 from mixing tank 126 or other source of the fracturing fluid 128 to tubing string 112. In other examples, the fracturing fluid 128 may be formulated offsite and transported to a worksite, in which case the fracturing fluid 128 may be introduced to tubing string 112 via pump 131 directly from its shipping container (e.g., a truck, a railcar, a barge, or the like) or from a transport pipeline. In either case, the fracturing fluid 128 may be drawn into pump 131, elevated to an appropriate pressure, and then introduced into tubing string 112 for delivery downhole.

Pump 131 may be a high-pressure pump in some examples. As used herein, the term "high-pressure pump" will refer to a pump that is capable of delivering a fluid downhole at a pressure of about 1000 psi or greater. The fracturing fluids 128 described herein may be introduced with a high-pressure pump. In some examples, the high-pressure pump may be capable of fluidly conveying particulate matter into formation 101. Suitable high-pressure pumps will be known to one having ordinary skill in the art and may include, but are not limited to, floating piston pumps and positive displacement pumps.

In other examples, the pump 131 may be a low-pressure pump. As used herein, the term "low-pressure pump" will refer to a pump 131 that operates at a pressure of less than about 1000 psi. In some examples, a low-pressure pump may be fluidly coupled to a high-pressure pump that is fluidly coupled to tubing string 112. That is, the low-pressure pump may be configured to convey the fracturing fluid 128 to the high-pressure pump. In such examples, the low-pressure pump may "step up" the pressure of a fracturing fluid 128 before it reaches the high-pressure pump. Alternatively, the low-pressure pump may be used to directly introduce the fracturing fluid 128 to formation 101 at a lower pressure.

In the illustrated example, the pump 131 pressurizes fracturing fluid 128 to maintain an injection flow rate sufficient to inject and deliver the fracturing fluid 128 into the well 106 and to produce or expand the fractures 110. As the fracturing fluid 128 flows through tubing string 112, the surface of the tubing string 112 that is contacted by the fracturing fluid may form a silicate coating from reaction with the metal silicate. Repeated exposure from prolonged fracturing fluid 128 contact and/or repeated fracturing fluid 128 treatments may thicken and stabilize the coating. The silicate coating enhances the friction reduction of the friction reducers within the fracturing fluid 128 as well as any subsequently used fracturing fluids 128. The now coated tubing string 112 may also be protected from chemical and/or electrochemical reactions that could cause pitting and/or corrosion of the tubing string 112. As such, the silicate coating may extend the useful life of the tubing string 128 thereby reducing operation costs.

It is to be understood that other alternative methods of injection of fracturing fluid 128 may be performed in an analogous manner. For example, instead of injection into fractures 110 via well 106 and tubing string 112, injection may occur through an adjacent or child well that has its own fractures which provide a connecting fluid pathway to fractures 110. The method of injection into the adjacent or child well would be analogous to that described above in FIG. 1 except the wellbore equipment of the adjacent or child well would receive the benefit of the silicate coating from the fracturing fluid 128.

It should be clearly understood that the example well system 100 illustrated by FIG. 1 is merely a general application of the principles of this disclosure in practice, and a wide variety of other examples are possible. Therefore, the scope of this disclosure is not limited in any manner to the details of FIG. 1 as described herein.

Figure 2:
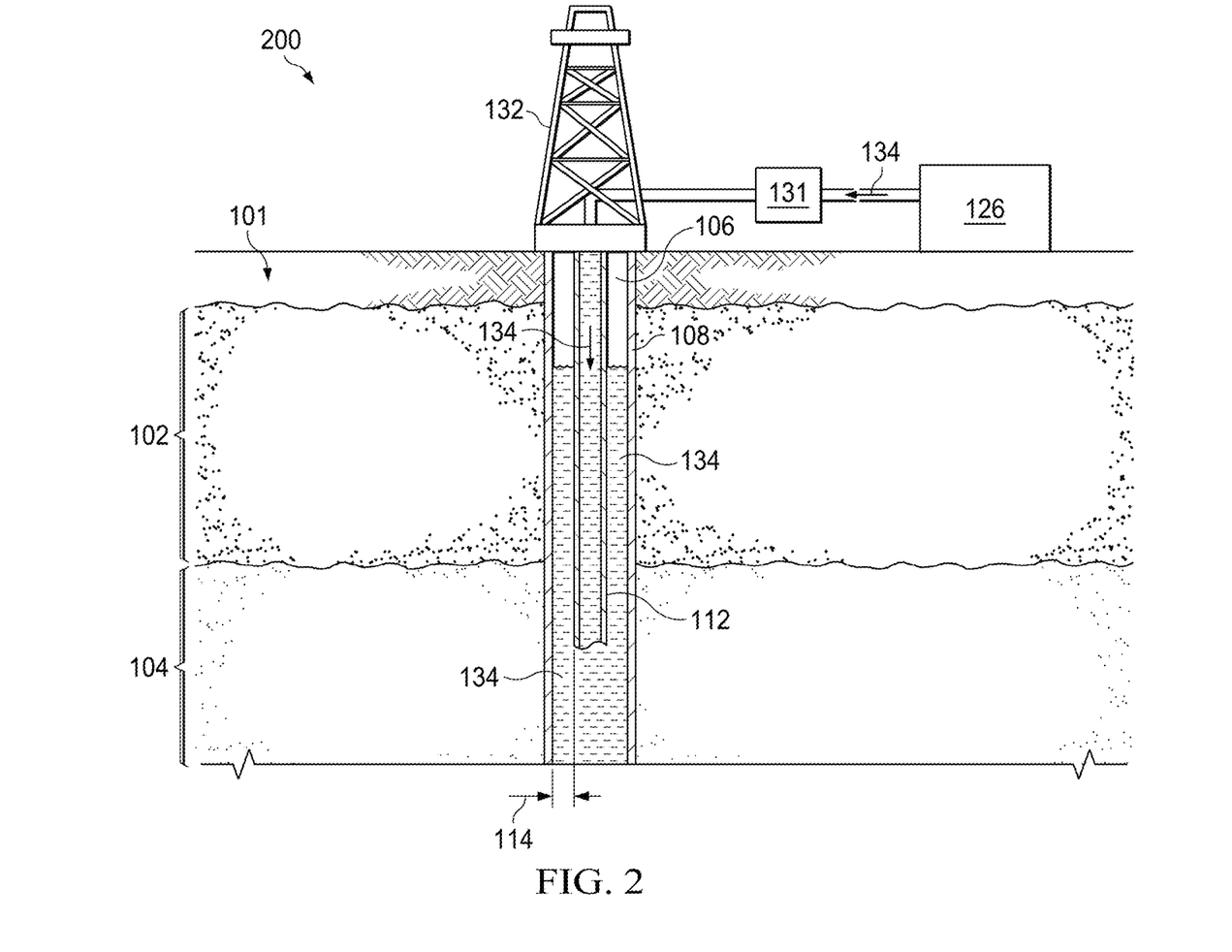
FIG. 2 is a schematic illustrating an example of a metal silicate soaking operation in accordance with one or more examples described herein.

FIG. 2 is a schematic view of another example fracturing system 200 according to one or more examples. The formation 101 includes reservoir volumes 102, 104 composed of porous and permeable rocks (i.e., reservoir rocks) that contain reservoir fluids (e.g., oil, gas, water, hydrocarbons) located in an onshore environment or in an offshore environment. A well system 100 includes at least one well 106 drilled to penetrate the formation 101 to carry out exploration and extraction of hydrocarbon fluids from the reservoir volumes 102, 104. The well 106 of FIG. 2 is shown as near vertical but can be formed at any suitable angle to reach a hydrocarbon-rich portion of the formation 101. In other examples, the well 106 can follow a partially vertical, angled, or even a partially horizontal path through the formation 101. The well 106 is shown as being lined with an optional protective lining 108 extending through the formation 101. The protective lining 108 may include a casing, liner, or tubing made of any material, including steel, alloys, or polymers, among others. The well 106 may also be partially or fully openhole, i.e., no protective lining.

In the example illustrated by FIG. 2, a treatment fluid 134 is injected into the well 106 to soak the tubing string 112 and at least a portion of annular area 114 located between an inner surface of the well 106 and the tubing string 112. The treatment fluid 134 is introduced prior to the commencement of the fracturing operation. The treatment fluid 134 comprises a metal silicate and a clay stabilizer. The treatment fluid 134 does not comprise a friction reducer as it is not a fracturing fluid as used in FIG. 1. The metal silicates within treatment fluid 134 may form a silicate coating on the tubing string 112 and may also alter the wettability of the formation 101 surfaces. The silicate coating formed on the tubing string 112 may enhance the friction reduction of subsequently injected fracturing fluids (e.g., fracturing fluid 128 as illustrated in FIG. 1). As illustrated, the treatment fluid 134 may be injected so as to fill substantially all of the interior of the tubing string 112 and a portion of the annular area 114 for example, the annular portion adjacent to the reservoir volumes 102 or just the annular portion adjacent to where the fractures are to be formed. In other examples, the treatment fluid 134 may fill substantially all of the interior of the tubing string 112 as well as substantially all of the annular area 114. The soaking operation may be continued for a sufficient time period so as to provide a suitably stable silicate coating layer on the interior of the tubing string 112. The surface portion of system 200 may include a mixing tank 126 in which the treatment fluid 134 may be formulated and prepared, as well as a pump 131 connected to wellhead 132. The mixing tank 126 and pump 131 function as described in FIG. 1. Although treatment fluid 134 is illustrated as treating the well 106 prior to the fracturing operation, it is to be understood that the treatment fluid 134 may be used after the injection of a fracturing fluid (e.g., after the operation described in FIG. 1) in a post-fracturing operation to replenish the silicate coating.

It is to be recognized that system 200 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

It should be clearly understood that the example system 200 illustrated by FIG. 2 is merely a general application of the principles of this disclosure in practice, and a wide variety of other examples are possible. Therefore, the scope of this disclosure is not limited in any manner to the details of FIG. 2 as described herein.

The treatment fluid comprises an aqueous base fluid and a metal silicate. In some optional embodiments, the treatment fluid comprises a friction reducer and/or a clay stabilizer. The metal silicate is a water-soluble metal silicate. Examples of the metal silicate may include, but are not limited to, sodium metal silicates, potassium metal silicates, and the combination thereof. Examples of sodium metal silicates may include, but are not limited to, sodium metasilicate, sodium orthosilicate, sodium pyrosilicate, and any combinations thereof. Examples of the potassium metal silicates may include, but are not limited to, potassium metasilicate, potassium orthosilicate, and the combination thereof.

The total concentration of the metal silicate in the treatment fluid may range from about 0.1% (w/v) to about 10%

(w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the metal silicate in the treatment fluid may range from about 0.01% (w/v) to about 5% (w/v), from about 0.05% (w/v) to about 5% (w/v), from about 0.1% (w/v) to about 5% (w/v), from about 0.5% (w/v) to about 5% (w/v), from about 1% (w/v) to about 5% (w/v), from about 2% (w/v) to about 5% (w/v), from about 3% (w/v) to about 5% (w/v), or from about 4% (w/v) to about 5% (w/v). As another example, the concentration of the metal silicate in the treatment fluid may range from about 0.01% (w/v) to about 5% (w/v), from about 0.01% (w/v) to about 4% (w/v), from about 0.01% (w/v) to about 3% (w/v), from about 0.01% (w/v) to about 2% (w/v), from about 0.01% (w/v) to about 1% (w/v), from about 0.01% (w/v) to about 0.5% (w/v), from about 0.01% (w/v) to about 0.1% (w/v), or from about 0.01% (w/v) to about 0.05% (w/v). With the benefit of this disclosure, one of ordinary skill in the art will be readily able to prepare a treatment fluid having a sufficient concentration of a metal silicate for a given application.

In some examples, the concentration of the metal silicate may be reduced for subsequently used treatment fluids. For example, an initial fracturing fluid or soaking treatment fluid may contain a high concentration of metal silicate, and subsequent injections of fracturing fluid may contain ½, ⅓, ¼, ¹⁄₁₀, etc. the high concentration of the initial fracturing fluid or soaking treatment fluid.

The treatment fluid comprises an aqueous base fluid. The aqueous base fluid may be from any source, provided that it does not contain an excess of compounds that may undesirably affect other components in the treatment fluid. In various examples, the aqueous base fluid may comprise fresh water, salt water, seawater, brine, or an aqueous salt solution. In some examples, the aqueous fluid may comprise a monovalent brine or a divalent brine. Suitable monovalent brines include, but are not limited to, sodium chloride brines, sodium bromide brines, potassium chloride brines, potassium bromide brines, and the like. Suitable divalent brines include, but are not limited to, magnesium chloride brines, calcium chloride brines, and the like. In some examples, the total dissolved solids content of the treatment fluid may range from about 0 to about 500 thousand parts per million (kppm) total dissolved solids.

The concentration of the aqueous base fluid in the treatment fluid may range from about 0.5% (w/v) to about 99% (w/v). The concentration of the aqueous fluid in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the aqueous fluid in the treatment fluid may range from about 0.5% (w/v) to about 99% (w/v), from about 1% (w/v) to about 99% (w/v), from about 5% (w/v) to about 99% (w/v), from about 10% (w/v) to about 99% (w/v), from about 15% (w/v) to about 99% (w/v), from about 20% (w/v) to about 99% (w/v), from about 25% (w/v) to about 99% (w/v), from about 30% (w/v) to about 99% (w/v), from about 35% (w/v) to about 99% (w/v), from about 40% (w/v) to about 99% (w/v), from about 45% (w/v) to about 99% (w/v), from about 50% (w/v) to about 99% (w/v), from about 55% (w/v) to about 99% (w/v), from about 60% (w/v) to about 99% (w/v), from about 65% (w/v) to about 99% (w/v), from about 70% (w/v) to about 99% (w/v), from about 75% (w/v) to about 99% (w/v), from about 80% (w/v) to about 99% (w/v), from about 85% (w/v) to about 99% (w/v), from about 90% (w/v) to about 99% (w/v), or from about 95% (w/v) to about 99% (w/v). As another example, the concentration of the aqueous fluid in the treatment fluid may range from about 0.5% (w/v) to about 99% (w/v), from about 0.5% (w/v) to about 95% (w/v), from about 0.5% (w/v) to about 90% (w/v), from about 0.5% (w/v) to about 85% (w/v), from about 0.5% (w/v) to about 80% (w/v), from about 0.5% (w/v) to about 75% (w/v), from about 0.5% (w/v) to about 70% (w/v), from about 0.5% (w/v) to about 65% (w/v), from about 0.5% (w/v) to about 60% (w/v), from about 0.5% (w/v) to about 55% (w/v), from about 0.5% (w/v) to about 50% (w/v), from about 0.5% (w/v) to about 45% (w/v), from about 0.5% (w/v) to about 40% (w/v), from about 0.5% (w/v) to about 35% (w/v), from about 0.5% (w/v) to about 30% (w/v), from about 0.5% (w/v) to about 25% (w/v), from about 0.5% (w/v) to about 20% (w/v), from about 0.5% (w/v) to about 15% (w/v), from about 0.5% (w/v) to about 10% (w/v), from about 0.5% (w/v) to about 5% (w/v), or from about 0.5% (w/v) to about 1% (w/v). With the benefit of this disclosure, one of ordinary skill in the art will be able to prepare a treatment fluid having a sufficient concentration of an aqueous base fluid for a given application.

In some optional examples, the treatment fluid may comprise a friction reducer. The friction reducer may reduce the friction pressure of the treatment fluid when the treatment fluid is used as a fracturing fluid and injected at a high injection rate. Examples of the friction reducer may include, but are not limited to, polymers comprising one or more monomeric units of acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters, the like, and any combination thereof. The friction reducer polymers may be in an acidic form or in a salt form.

The total concentration of the friction reducer in the treatment fluid may range from about 0.1% (w/v) to about 10% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the friction reducer in the treatment fluid may range from about 0.01% (w/v) to about 1% (w/v), from about 0.05% (w/v) to about 1% (w/v), from about 0.1% (w/v) to about 1% (w/v), or from about 0.5% (w/v) to about 1% (w/v). As another example, the concentration of the friction reducer in the treatment fluid may range from about 0.01% (w/v) to about 1% (w/v), from about 0.01% (w/v) to about 0.5% (w/v), from about 0.01% (w/v) to about 0.1% (w/v), or from about 0.01% (w/v) to about 0.05% (w/v). With the benefit of this disclosure, one of ordinary skill in the art will be readily able to prepare a treatment fluid having a sufficient concentration of a friction reducer for a given application.

In some optional examples, the treatment fluid may comprise a clay stabilizer. Clay stabilizers may be used to prevent and/or reduce migration or swelling of clays in reaction to an aqueous-based treatment fluid. Examples of suitable clay stabilizers may include, but are not limited to, salts (e.g., KCl, NaCl, NH4Cl), quaternary amines, polymer such as nonionic polyacrylamide, low molecular weight nonionic polyacrylamide, high molecular weight nonionic polyacrylamide, etc. As used herein, a low molecular weight nonionic polyacrylamide refers to a polyacrylamide with a molecular weight of less than two million, and a high molecular weight nonionic polyacrylamide refers to a polyacrylamide with a molecular weight of between 14 million to 16 million. In some examples, the clay stabilizer may include polymers derived from heterocyclic compounds further including nitrogen. The polymers may or may not be crosslinked. In some examples, the clay stabilizer may include a polymeric heterocyclic nitrogen-containing compound present in an amount sufficient to inhibit degradation of shale in the subterranean formation. In one example, the heterocyclic nitrogen-containing compound includes straight chain polyvinyl pyrrolidone. In another example, the heterocyclic nitrogen-containing compound includes crosslinked polyvinyl pyrrolidone.

The total concentration of the clay stabilizer in the treatment fluid may range from about 0.1% (w/v) to about 10% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the clay stabilizer in the treatment fluid may range from about 0.1% (w/v) to about 10% (w/v), from about 0.5% (w/v) to about 10% (w/v), from about 1% (w/v) to about 10% (w/v), from about 2% (w/v) to about 10% (w/v), from about 3% (w/v) to about 10% (w/v), from about 4% (w/v) to about 10% (w/v), from about 5% (w/v) to about 10% (w/v), from about 6% (w/v) to about 10% (w/v), from about 7% (w/v) to about 10% (w/v), from about 8% (w/v) to about 10% (w/v), or from about 9% (w/v) to about 10% (w/v). As another example, the concentration of the clay stabilizer in the treatment fluid may range from about 0.1% (w/v) to about 10% (w/v), from about 0.1% (w/v) to about 9% (w/v), from about 0.1% (w/v) to about 8% (w/v), from about 0.1% (w/v) to about 7% (w/v), from about 0.1% (w/v) to about 6% (w/v), from about 0.1% (w/v) to about 5% (w/v), from about 0.1% (w/v) to about 4% (w/v), from about 0.1% (w/v) to about 3% (w/v), from about 0.1% (w/v) to about 2% (w/v), or from about 0.1% (w/v) to about 1% (w/v). With the benefit of this disclosure, one of ordinary skill in the art will be readily able to prepare a treatment fluid having a sufficient concentration of a clay stabilizer for a given application.

In some optional examples, the treatment fluid may comprise a proppant. Examples of proppant may include, but are not limited to, sand, bauxite, fly ash, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. In some examples, the proppant may be further selected based on particle size and may be distinguished by the terms "large proppant" and "microproppant." For clarity and simplicity, as used herein, the term "microproppant" refers to proppant having a minimum diameter of 0.1 microns and having a number average diameter of about 0.5 microns to about 25 microns, including any subset therebetween (e.g., about 1 micron to about 10 microns). Further as used herein, the term "large proppant" refers to proppant having a number average diameter of about 75 microns to about 500 microns, including any subset therebetween (e.g., about 100 micron to about 250 microns, about 200 to about 500 microns, or about 150 to about 400 microns).

The total concentration of the proppant in the treatment fluid may range from about 0.1 pounds per gallon ("ppg") to about 10 ppg. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the proppant in the treatment fluid may range from about 0.1 ppg to about 10 ppg, from about 0.1 ppg to about 10 ppg, from about 0.5 ppg to about 10 ppg, from about 1 ppg to about 10 ppg, from about 2 ppg to about 10 ppg, from about 3 ppg to about 10 ppg, from about 4 ppg to about 10 ppg, from about 5 ppg to about 10 ppg, from about 6 ppg to about 10 ppg, from about 7 ppg to about 10 ppg, from about 8 ppg to about 10 ppg, or from about 9 ppg to about 10 ppg. As another example, the concentration of the clay stabilizer in the treatment fluid may range from about 0.1 ppg to about 10 ppg, from about 0.1 ppg to about 9 ppg, from about 0.1 ppg to about 8 ppg, from about 0.1 ppg to about 7 ppg, from about 0.1 ppg to about 6 ppg, from about 0.1 ppg to about 5 ppg, from about 0.1 ppg to about 4 ppg, from about 0.1 ppg to about 3 ppg, from about 0.1 ppg to about 2 ppg, or from about 0.1 ppg to about 1 ppg. With the benefit of this disclosure, one of ordinary skill in the art will be readily able to prepare a treatment fluid having a sufficient concentration of proppant for a given application.

In some optional examples, the treatment fluid may comprise an additive. The additive may be used to adjust a property of the treatment fluid, for example, viscosity, density, etc. Examples of the additives include, but are not limited to, silica scale control additives, corrosion inhibitors, surfactants, gel stabilizers, anti-oxidants, polymer degradation prevention additives, relative permeability modifiers, scale inhibitors, foaming agents, defoaming agents, anti-foaming agents, emulsifying agents, de-emulsifying agents, iron control agents, nanoparticles, micro-proppants, proppants or other particulates, particulate diverters, salts, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, hydrate inhibitors, consolidating agents, bactericides, clay stabilizers, breakers, delayed release breakers, the like, or any combination thereof. With the benefit of this disclosure, one of ordinary skill in the art and the benefit of this disclosure will be able to formulate a treatment fluid having properties suitable for a desired application.

Figure 3:
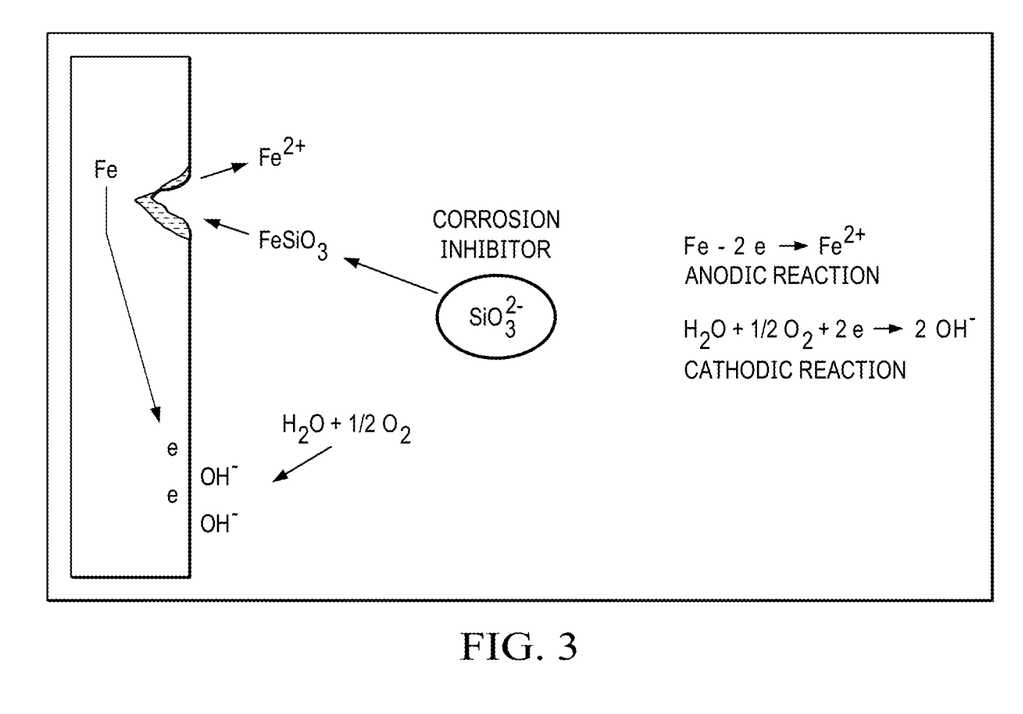
FIG. 3 is a schematic illustrating silicate formation on a metal surface in a brine fluid in accordance with one or more examples described herein.

FIG. 3 is a schematic illustrating silicate formation on a metal surface in a brine fluid. A dissolved water-soluble silicate provides protection to iron and steel by prohibiting the anodic dissolution of the iron or steel. As illustrated, the silicate has a strong anodic inhibition in a highly alkaline medium, allowing the $(SiO_3)^{2-}$ ions to migrate to the anode region of the metal surface and react with the $Fe^{2+}$ ions present. This reaction forms a protective film of iron silicate ($FeSiO_3$) as illustrated. The water-soluble silicates also react with cationic metals and metal surfaces. $Mg^{2+}$ and $Ca^{2+}$ ions present in the brine solution may migrate to the cathodic areas, thereby finding the $OH^-$ ions and forming a protective film of $Mg(OH)_2$ and $Ca(OH)_2$. Monomeric silica ($H_2SiO_4)^{2-}$ is absorbed onto the metal surface at the anodic sites. At this interface, the metal silicate is then overlaid by an amorphous silica layer. Once the silica film has been formed, the deposition may stop. Over time, a uniform protective film is developed on the metal surface by adsorption in an alkaline medium. Inhibition of the anodic and cathodic reactions provides protection against corrosion in a brine solution. The film coating may be eroded from abrasion over time caused by high-shear proppant slurries. In some examples, it may be beneficial to replenish the film with fresh metal silicate by continuous or intermittent adding/metering of metal silicate into the treatment fluid.

Figure 4A:
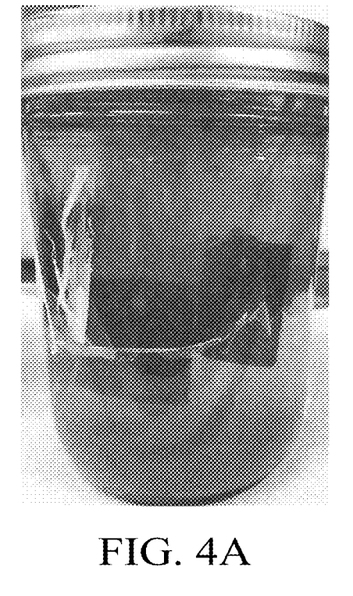
FIG. 4A is a comparison experiment illustrated by two photographs in accordance with one or more examples described herein.
Figure 4B:
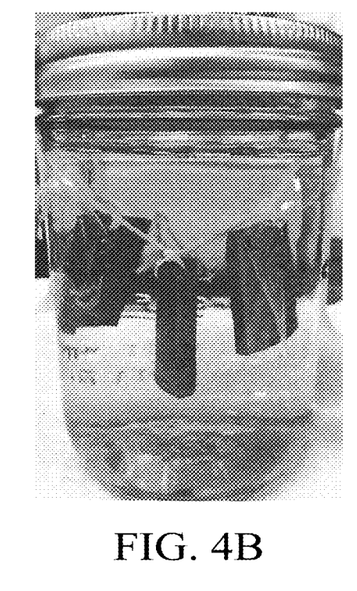
FIG. 4B is a comparison experiment illustrated by two photographs in accordance with one or more examples described herein.

FIGS. 4A and 4B illustrate a comparison experiment of the effectiveness of corrosion inhibition provided by sodium silicate for stainless steel coupons suspended in a 10% HCl solution. Photo 4A is a coupon in the HCl solution without a silicate coating. Photo 4B is a coupon in the HCl solution with application of a silicate coating. To conduct the experiment, the stainless steel coupons were weighed on an analytical balance to obtain the initial weight ("Wi"). A 10 gal/Mgal sodium silicate alkaline solution was used to pretreat three coupons. A solution containing 10% HCl (pH 1.5) was prepared and placed into a closed lid jar. Three coupons were suspended in the 10% HCl solution using silicon tape. A second solution was prepared by mixing the 10% HCl solution and 10 gal/Mgal sodium silicate. The three pretreated coupons were suspended in this second jar using silicon tape. Both jars containing the coupons were placed in a 60° C. water bath for 21 hrs. under static conditions. After this period of exposure, the coupons were removed, rinsed with distilled water and allowed to dry. After drying, the coupons were re-weighed to determine the final weight ("Wf") and the percent mass loss was calculated with the equation below:

$$\% \text{ Mass Loss} = ((Wf - Wi)/Wi) \times 100$$

Figure 5A:
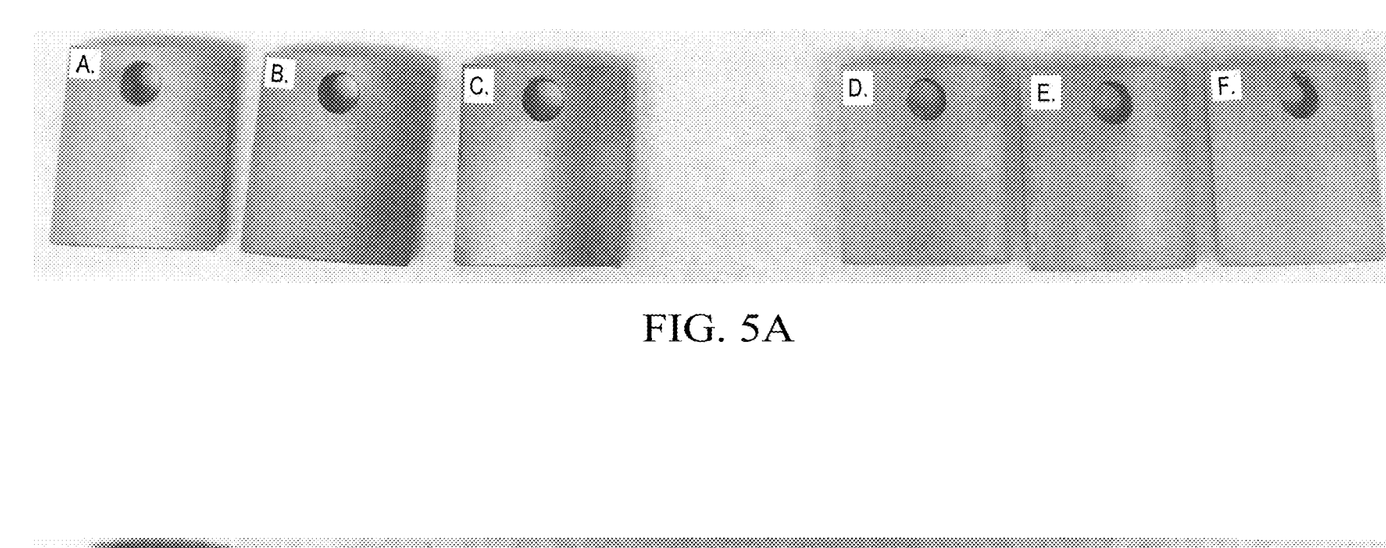
FIG. 5A illustrates the stainless steel coupons of FIGS. 4A and 4B with and without sodium silicate exposure in accordance with one or more examples described herein.
Figure 5B:
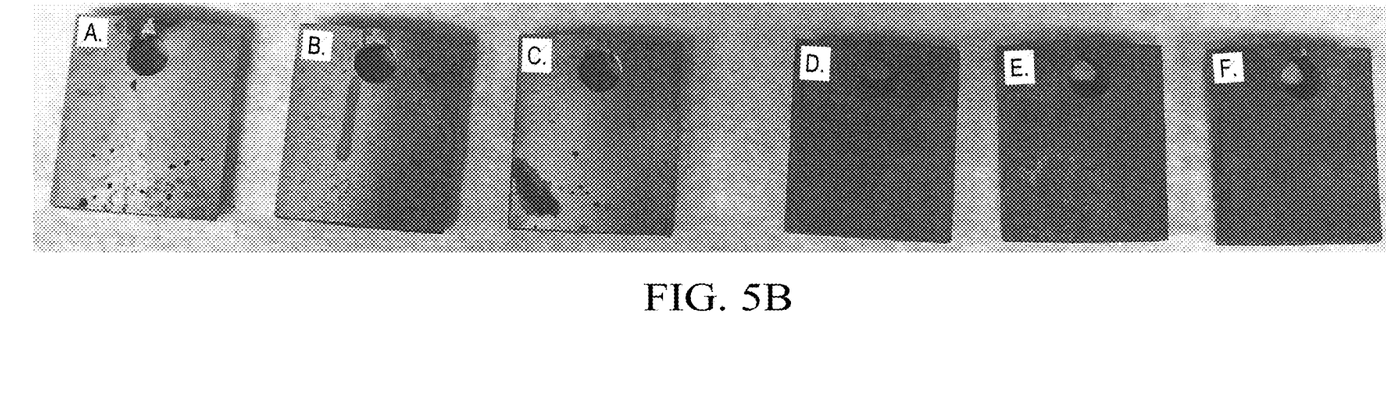
FIG. 5B illustrates the stainless steel coupons of FIGS. 4A and 4B with and without sodium silicate exposure in accordance with one or more examples described herein.

FIGS. 5A and 5B illustrate the stainless steel coupons of FIGS. 4A and 4B with (A,B,C) and without (D,E,F) sodium silicate exposure. Photo 5A illustrates the stainless steel coupons before exposure to the 10% HCl solution. Photo 5B illustrates the stainless steel coupons post exposure to 10% HCl solution at 60° C. for 21 hrs. The average % mass loss of the stainless steel coupons placed in the HCl solution without sodium silicate was 0.1615%. The average % mass loss of the stainless steel coupons placed in the HCl solution containing sodium silicate was −0.0851%. The negative sign indicates a mass gain of the coupons as a result of the iron silicate coating on the metal surfaces of coupons.

Figure 6:
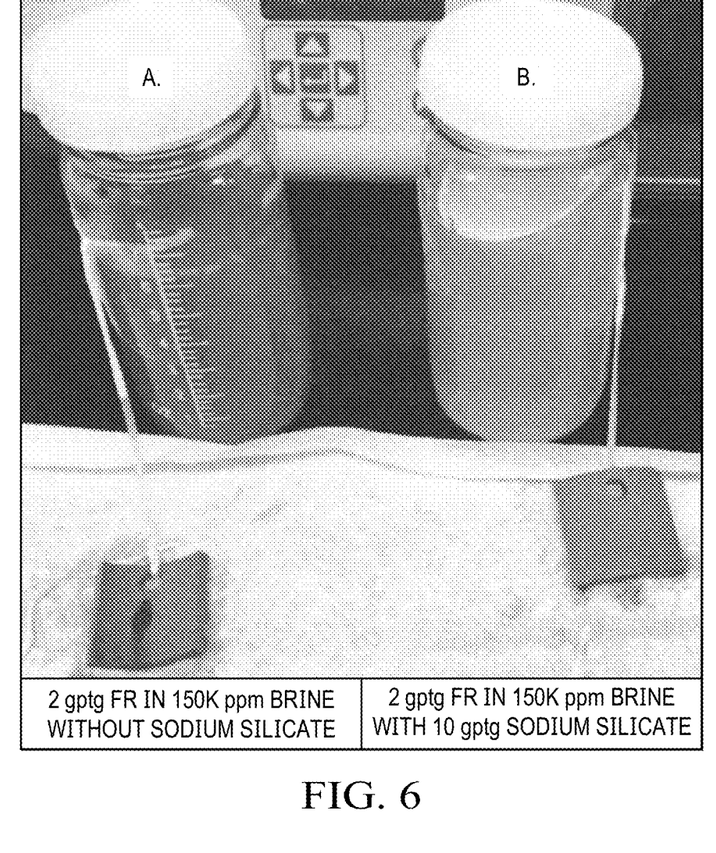
FIG. 6 is a photograph of the fracturing fluid appearance and associated stainless steel coupons without and with sodium silicate in accordance with one or more examples described herein.

FIG. 6 is a photograph of the fracturing fluid appearance and associated stainless steel coupons without and with sodium silicate. The left vessel did not contain sodium silicate. The right vessel did contain sodium silicate. To perform the experiment, stainless steel coupons with similar dimensions and masses were exposed to a fluid with a high total dissolved solids content to determine the effectiveness of the corrosion inhibition of sodium silicate. As a control, a coupon was placed in a glass jar containing a fracturing fluid comprising 2 gallons per thousand gallons ("gptg") of polyacrylamide friction reducer and 150,000 ppm synthetic brine. Another coupon was placed in a different jar containing a similar fracturing fluid, but also included 10 gptg of sodium silicate. Without lids, the jars were placed in a vessel and pressurized to 150 psi at 60° C. These conditions were maintained for 7 days. After 7 days, the coupons were removed from the jars. The fluids from the jars were analyzed using an inductively coupled plasma ("ICP") procedure to determine the iron content in each fluid. The ICP results showed only 1 mg/L of iron was present in the fracturing fluid containing the sodium silicate, whereas 60 mg/L of iron was present in the fracturing fluid that did not contain the sodium silicate.

In a different experiment, friction reducer performance testing was conducted to evaluate friction reducer performance alone or in combination with other additives. The testing was also conducted to analyze friction reducer performance in tap water, field source water, or synthetic brines having different levels of total dissolved solids. The salts present in the testing waters and also some of the additives can corrode the friction flow loop pipe. The experiments used fracturing fluids with and without sodium silicate to determine if sodium silicate was compatible with the selected friction reducers. Compatibility tests were performed with common friction reducers. Tests were performed in tap water ("TW") and 10-50 thousand parts per million (kppm) total dissolved solids ("TDS") synthetic Ellenberger ("EB") brine at a constant flow rate (e.g., 10 gallons per minute ("gpm")) or ramped conditions, where flow rate was varied (10 gpm, 20 gpm, 10 gpm), to study the effects on hydration, polymer degradation, and stability due to shear effect. Friction performance (i.e., % friction reduction ("% FR")) is based on the pressure drop measured across a 2-feet section of the stainless-steel pipe versus the theoretical pressure drop of untreated water at the designed testing conditions.

Figure 7:
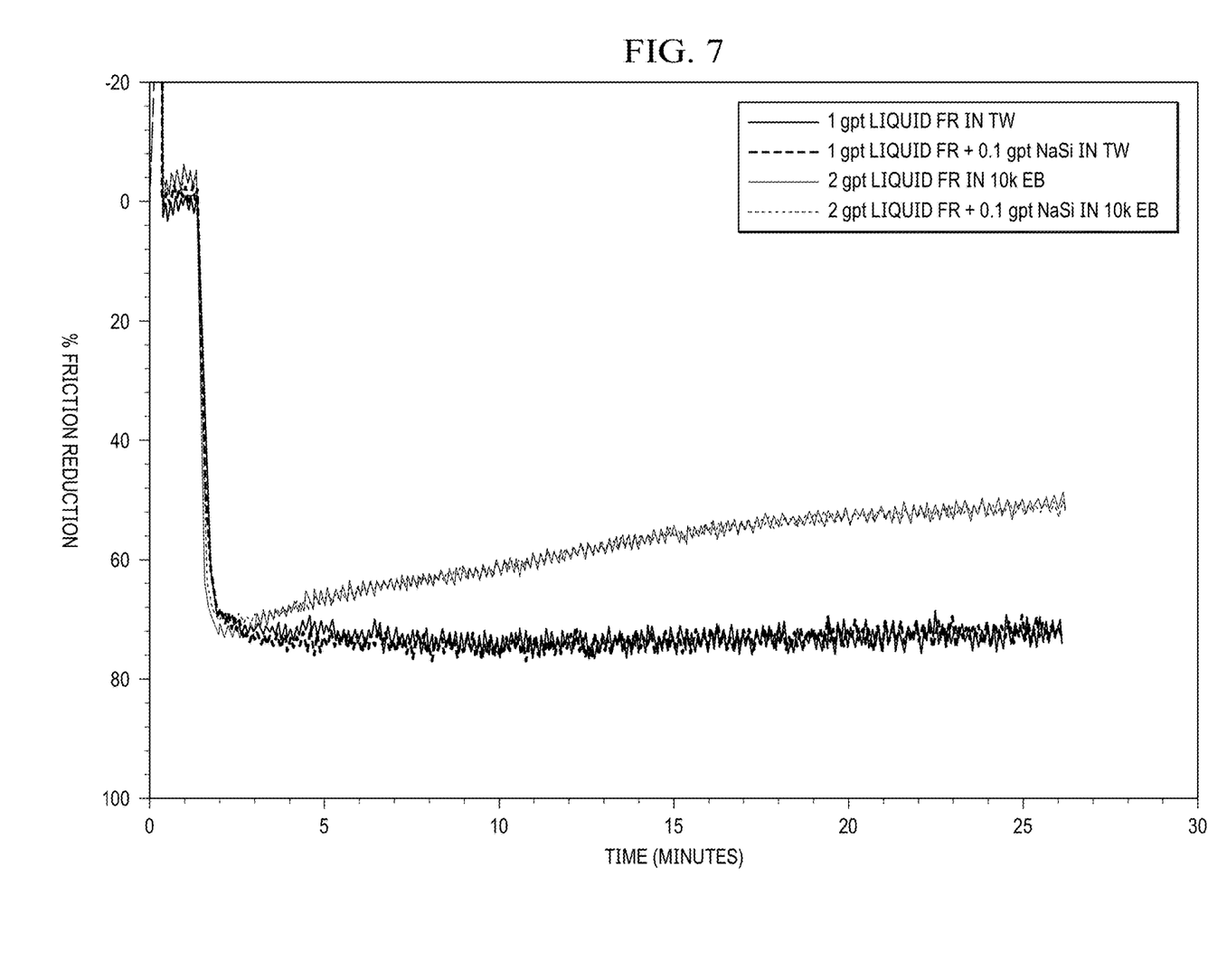
FIG. 7 is a graph providing a summary of the results performed with an anionic liquid high-viscosity friction reducer at a constant flow rate in both tap water and a 10 k total dissolved solids content Ellenberger brine in accordance with one or more examples described herein.

FIG. 7 is a graph providing a summary of the testing results with an anionic liquid high-viscosity friction reducer ("HVFR") at a constant flow rate in both TW and a 10 k EB brine. The results indicate that the friction reduction performance is negatively impacted by the high salt content of the EB brine. The inclusion of NaSi was compatible with a slickwater fracturing fluid prepared in the TW or in EB brine. Moreover, the results indicate sufficient friction reduction as well as compatibility in both the TW and 10 k synthetic EB brine.

Figure 8:
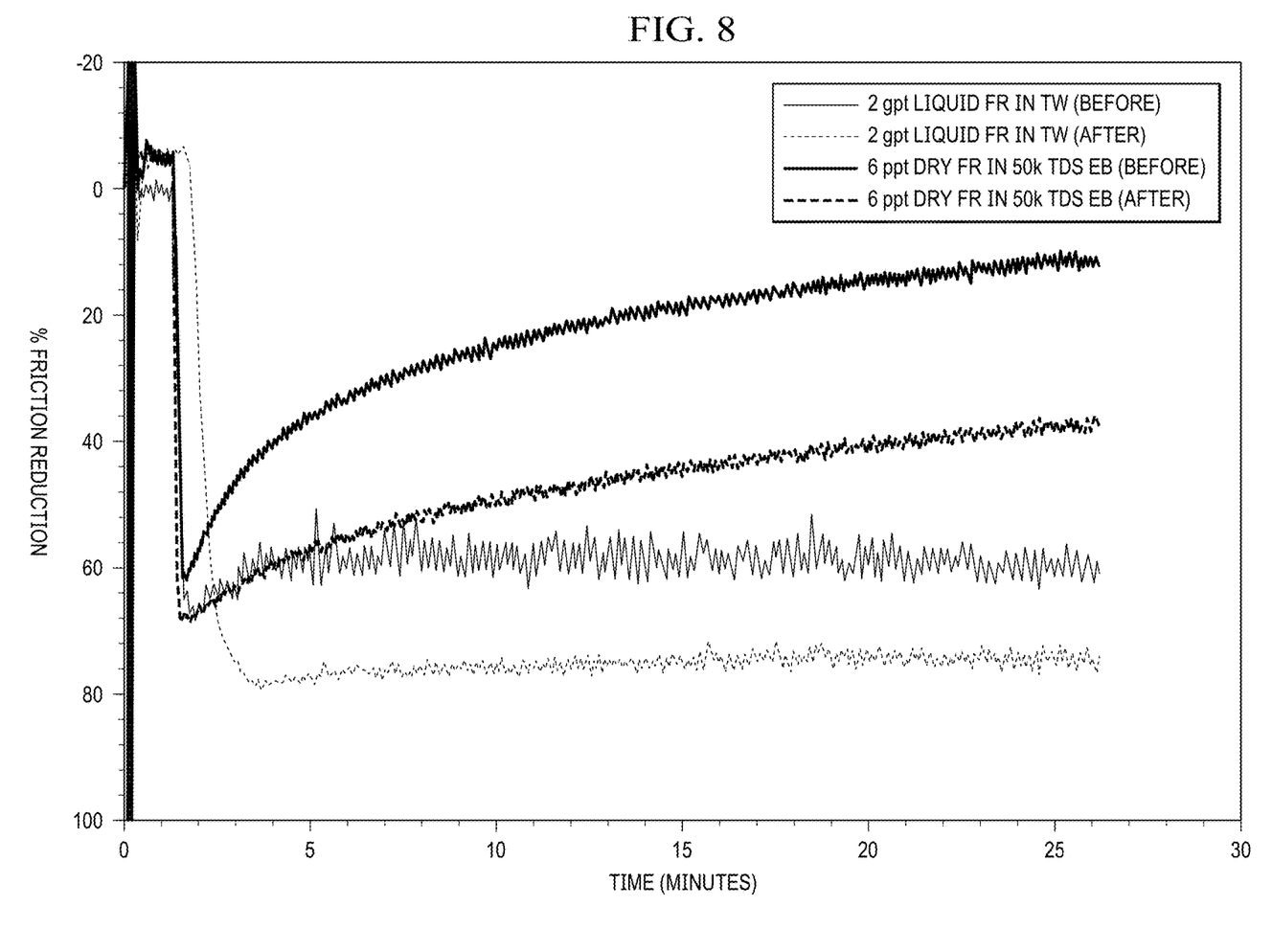
FIG. 8 is a graph illustrating an enhancement on friction reduction performance in friction loop tests of high friction reducer concentrations in accordance with one or more examples described herein.
Figure 9:
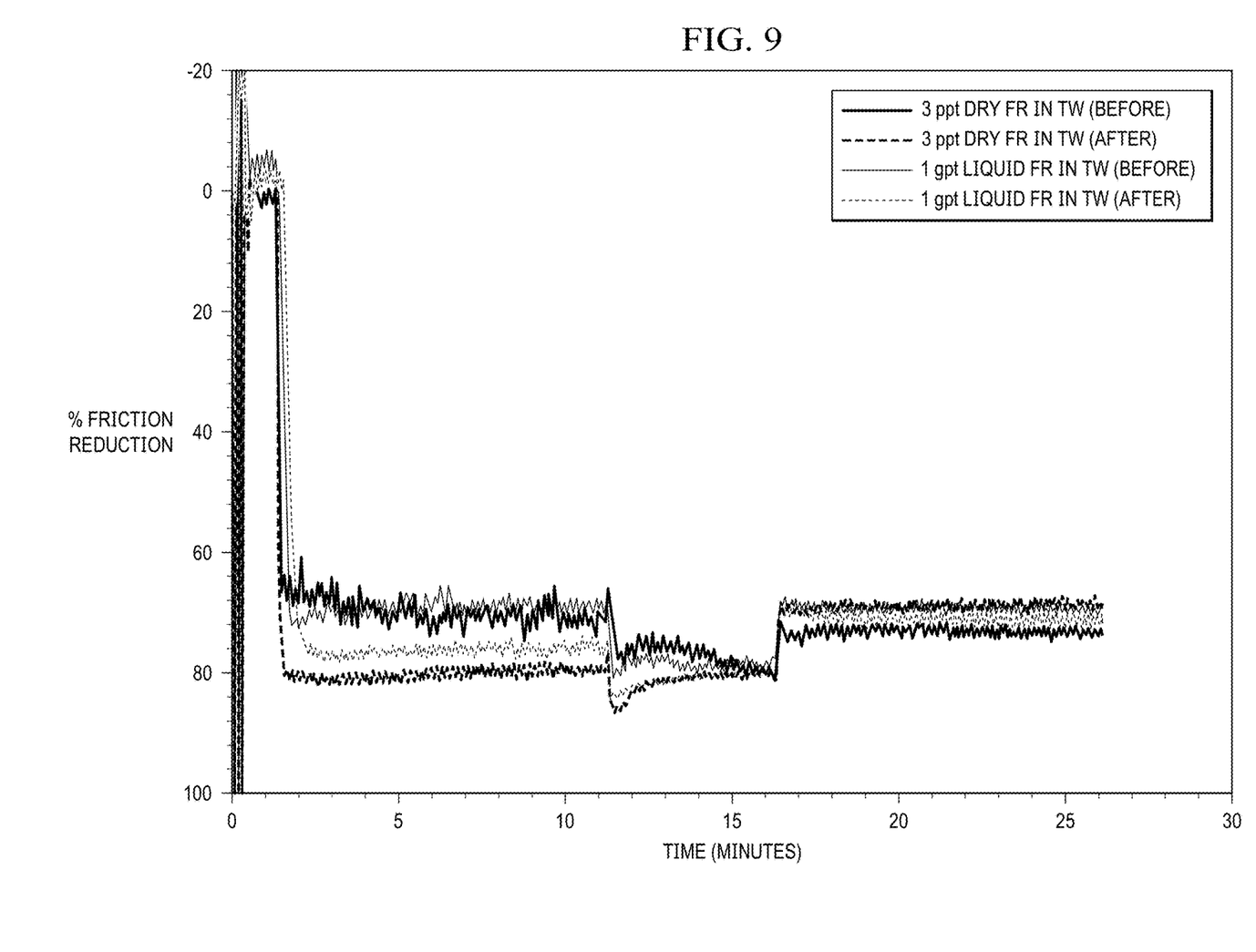
FIG. 9 is a graph illustrating an enhancement on friction reduction performance in friction loop tests of low friction reducer concentrations in accordance with one or more examples described herein.

The impact that the sodium silicate has on a metal surface was studied after a series of tests were completed in the friction flow loop. An enhancement on friction reduction performance was observed. An improvement of 60-70% friction reduction over those of typical FR testing was observed in friction loop tests of high FR concentrations provided in liquid or dry form as illustrated by the graph of FIG. 8. After sodium silicate was introduced into the equipment, an increase of at least 10% was seen in friction reduction even with FRs at lower concentrations as illustrated by the graph of FIG. 9. These results indicate that the tests conducted with sodium silicate had left a smoother surface behind. Despite the use of high shear while cleaning the friction flow loop as well as multiple flushes used to clean the loop, these efforts were not sufficient to remove the coating formed by sodium silicate in the interior surface of the flow loop.

It is also to be recognized that the disclosed treatment fluids may also directly or indirectly affect the various downhole equipment and tools that may contact the treatment fluids disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIGS. 1-2.

Provided are methods for fracturing a subterranean formation in accordance with the disclosure and the illustrated FIGs. An example method comprises introducing a treatment fluid into a wellbore tubing disposed in a wellbore; wherein the wellbore tubing comprises metal ions; and wherein the treatment fluid comprises an aqueous fluid and a metal silicate. The method further comprises coating at least a portion of the wellbore tubing with a silicate film produced from the reaction of the metal silicate with the metal ions of the wellbore tubing and fracturing the subterranean formation with a fracturing fluid. The fracturing fluid may be introduced into the wellbore tubing.

Additionally or alternatively, the method may include one or more of the following features individually or in combination. The treatment fluid may be a fracturing fluid and the fracturing of the subterranean formation is performed with the treatment fluid. The fracturing fluid may be a first fracturing fluid and the fracturing of the subterranean formation is repeated with a second fracturing fluid and the second fracturing fluid comprises a lower concentration of metal silicate than the first fracturing fluid. The fracturing fluid may comprise proppant. The fracturing fluid may comprise a friction reducer. The friction reducer may be a polymer comprising one or more monomeric units selected from the group consisting of acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters, and any combination thereof. The treatment fluid may not comprise a friction reducer. The treatment fluid may comprise a clay stabilizer. The clay stabilizer may be a salt, a quaternary amine, or polyacrylamide. The method may further comprise at least partially filling the wellbore with the treatment fluid before or after the fracturing of the subterranean formation. The metal silicate may comprise a sodium silicate, a potassium silicate, or the combination thereof. The treatment fluid may comprise a total dissolved solids content of 1-500 thousand parts per million.

Provided are treatment fluids for fracturing a subterranean formation in accordance with the disclosure and the illustrated FIGs. An example treatment fluid comprises an aqueous fluid comprising a total dissolved solids content of 1-500 thousand parts per million and a metal silicate.

Additionally or alternatively, the treatment fluid may include one or more of the following features individually or in combination. The treatment fluid may be a fracturing fluid and the fracturing of the subterranean formation is performed with the treatment fluid. The fracturing fluid may comprise proppant. The fracturing fluid may comprise a friction reducer. The friction reducer may be a polymer comprising one or more monomeric units selected from the group consisting of acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters, and any combination thereof. The treatment fluid may not comprise a friction reducer. The treatment fluid may comprise a clay stabilizer. The clay stabilizer may be a salt, a quaternary amine, or polyacrylamide. The metal silicate may comprise a sodium silicate, a potassium silicate, or the combination thereof.

Provided are systems for fracturing a subterranean formation in accordance with the disclosure and the illustrated FIGs. An example system comprises a treatment fluid comprising an aqueous fluid comprising a total dissolved solids content of 1-500 thousand parts per million and a metal silicate. The system further comprises mixing equipment configured to mix the aqueous fluid and the metal silicate to provide the treatment fluid, pumping equipment configured to pump the treatment fluid into a wellbore tubing, and wellbore tubing to be contacted by the metal silicate after the treatment fluid is pumped into the wellbore.

Additionally or alternatively, the system may include one or more of the following features individually or in combination. The treatment fluid may be a fracturing fluid and the fracturing of the subterranean formation is performed with the treatment fluid. The fracturing fluid may comprise proppant. The fracturing fluid may comprise a friction reducer. The friction reducer may be a polymer comprising one or more monomeric units selected from the group consisting of acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters, and any combination thereof. The treatment fluid may not comprise a friction reducer. The treatment fluid may comprise a clay stabilizer. The clay stabilizer may be a salt, a quaternary amine, or polyacrylamide. The metal silicate may comprise a sodium silicate, a potassium silicate, or the combination thereof. The wellbore tubing may be composed of iron or an iron alloy.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of or "consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for fracturing a subterranean formation, the method comprising:
   at least partially filling a wellbore containing a wellbore tubing with an alkaline pretreatment fluid comprising:
      a first aqueous fluid, and
      a first metal silicate;
   wherein the wellbore tubing comprises metal ions;
   then coating at least a portion of the wellbore tubing with a silicate film produced from a reaction of the first metal silicate with the metal ions of the wellbore tubing;
   then introducing a treatment fluid into the wellbore tubing disposed in the wellbore; wherein the treatment fluid comprises:
      a second aqueous fluid, and
      a second metal silicate;
   and
   fracturing the subterranean formation.

2. The method of claim 1, wherein the treatment fluid is a fracturing fluid and the fracturing of the subterranean formation is performed with the fracturing fluid.

3. The method of claim 2, wherein the fracturing fluid is a first fracturing fluid; wherein the fracturing of the subterranean formation is repeated with a second fracturing fluid and the second fracturing fluid comprises a lower concentration of metal silicate than the first fracturing fluid.

4. The method of claim 2, wherein the fracturing fluid comprises proppant.

5. The method of claim 2, wherein the fracturing fluid comprises a friction reducer.

6. The method of claim 5, wherein the friction reducer is a polymer comprising one or more monomeric units selected from the group consisting of acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters, and any combination thereof.

7. The method of claim 1, wherein the treatment fluid is substantially free of a friction reducer, and wherein the treatment fluid comprises a clay stabilizer.

8. The method of claim 7, wherein the clay stabilizer is a salt, a quaternary amine, or polyacrylamide.

9. The method of claim 1, further comprising at least partially filling the wellbore with another alkaline pretreatment fluid comprising a third aqueous fluid and a third metal silicate t after the fracturing of the subterranean formation.

10. The method of claim 1, wherein at least one of the first or second metal silicate comprises a sodium silicate, a potassium silicate, or the combination thereof.

11. The method of claim 1, wherein the treatment fluid comprises a total dissolved solids content of 1-500 thousand parts per million.

12. A system for treating a subterranean formation, the system comprising:
   an alkaline pretreatment fluid comprising:
      a first aqueous fluid,
      a first metal silicate;
   a treatment fluid comprising:
      a second aqueous fluid comprising a total dissolved solids content of 1-500 thousand parts per million, and
      a second metal silicate,
   mixing equipment configured to mix the first aqueous fluid and the first metal silicate to provide the pretreatment fluid, and to mix the second aqueous fluid and the second metal silicate to provide the treatment fluid,
   pumping equipment configured to pump the pretreatment fluid and the treatment fluid into a wellbore tubing,
   the wellbore tubing to be contacted by the first metal silicate after the pretreatment fluid is pumped into the wellbore, wherein the wellbore tubing comprises metal ions, and
   a silicate film produced from a reaction of the first metal silicate with the metal ions of the wellbore tubing.

13. The system of claim 12, wherein the wellbore tubing is composed of iron or an iron alloy.

14. The system of claim 12, wherein the at least one of the first or second metal silicate comprises a sodium silicate, a potassium silicate, or the combination thereof.

* * * * *